United States Patent [19]

Ditcher et al.

[11] Patent Number: 4,903,970
[45] Date of Patent: Feb. 27, 1990

[54] APPARATUS FOR PROVIDING A WATERTIGHT SEAL FOR MANHOLE PIPE CONNECTIONS INCLUDING A FOLDABLE GASKET AND CLAMPING BAND ASSEMBLY AND EXPANSION MEANS FOR INSTALLING THE GASKET AND CLAMPING BAND ASSEMBLY

[75] Inventors: Jack Ditcher; James A. Westhoff, both of Langhorne, Pa.

[73] Assignee: A-LOK Products, Inc., Tullytown, Pa.

[21] Appl. No.: 91,408

[22] Filed: Aug. 31, 1987

Related U.S. Application Data

[62] Division of Ser. No. 778,690, Sep. 23, 1985, Pat. No. 4,711,455.

[51] Int. Cl.[4] .......................... B23P 19/00; F16J 15/10; F16L 5/02; F16L 21/08
[52] U.S. Cl. ......................................... 277/9.5; 29/235; 29/239; 29/451; 277/9; 277/101; 277/138; 277/146; 277/207 A; 277/212 FB; 285/18; 285/39; 285/230; 285/236
[58] Field of Search ................. 29/235, 450, 451, 223, 29/239; 277/1, 9, 221, 9.5, 101, 138, 146, 207 A, 212 FB; 285/18, 39, 230, 236; 411/407

[56] References Cited

U.S. PATENT DOCUMENTS

| | | | |
|---|---|---|---|
| 1,117,083 | 11/1914 | Patchell | 29/223 |
| 1,211,692 | 1/1917 | Endebrock et al. | 277/221 |
| 1,274,038 | 7/1918 | Hilker | 277/221 |
| 1,359,596 | 11/1920 | Hill | 277/149 X |
| 3,293,978 | 12/1966 | Handley | 411/407 |
| 3,808,937 | 5/1974 | Roehrig | 411/407 |
| 3,958,313 | 5/1976 | Rossborough | 285/230 X |
| 4,103,901 | 8/1978 | Ditcher | 285/230 X |
| 4,203,190 | 5/1980 | Temple et al. | 285/230 X |
| 4,215,868 | 8/1980 | Skinner et al. | 285/189 X |
| 4,387,900 | 6/1983 | Ditcher | 277/212 FB X |
| 4,478,437 | 10/1984 | Skinner | 285/236 X |
| 4,711,455 | 12/1987 | Ditcher et al. | 277/212 FB X |

Primary Examiner—Allan N. Shoap
Attorney, Agent, or Firm—Louis Weinstein

[57] ABSTRACT

A resilient gasket having an outer flange positioned within a manhole opening and held by a compression band. The gasket has a central opening with an enlarged beaded periphery to encircle a pipe. A tapered intermediate section is joined to the outer flange and the beaded periphery. The intermediate section folds after insertion and clamping in an opening to form diagonally aligned annular portions defining a V-shaped yieldable gasket to maintain a watertight seal between opening and pipe, even when misaligned. A strap encircling the gasket next to the beaded periphery enhances the watertight seal between gasket and pipe. The clamping band has grooves which cooperate with projections of a piston cylinder assembly. The clamping band is formed of material impervious to the surrounding environment. The expansion assembly includes the aforementioned piston cylinder assembly which cooperates with an hydraulic jack and is positioned with its projections against the grooves of the clamping band to expand the clamping band into a locked position against the gasket flange and to apply a force directly upon the clamping band to insure proper positioning the locking of the clamping band. The hydraulic jack may also include a swingable member having a free end which moves along a curved path to follow the movement of the clamping band as it expands. The initial configuration of the gasket expedites the insertion, expansion and locking of the clamping band.

8 Claims, 5 Drawing Sheets

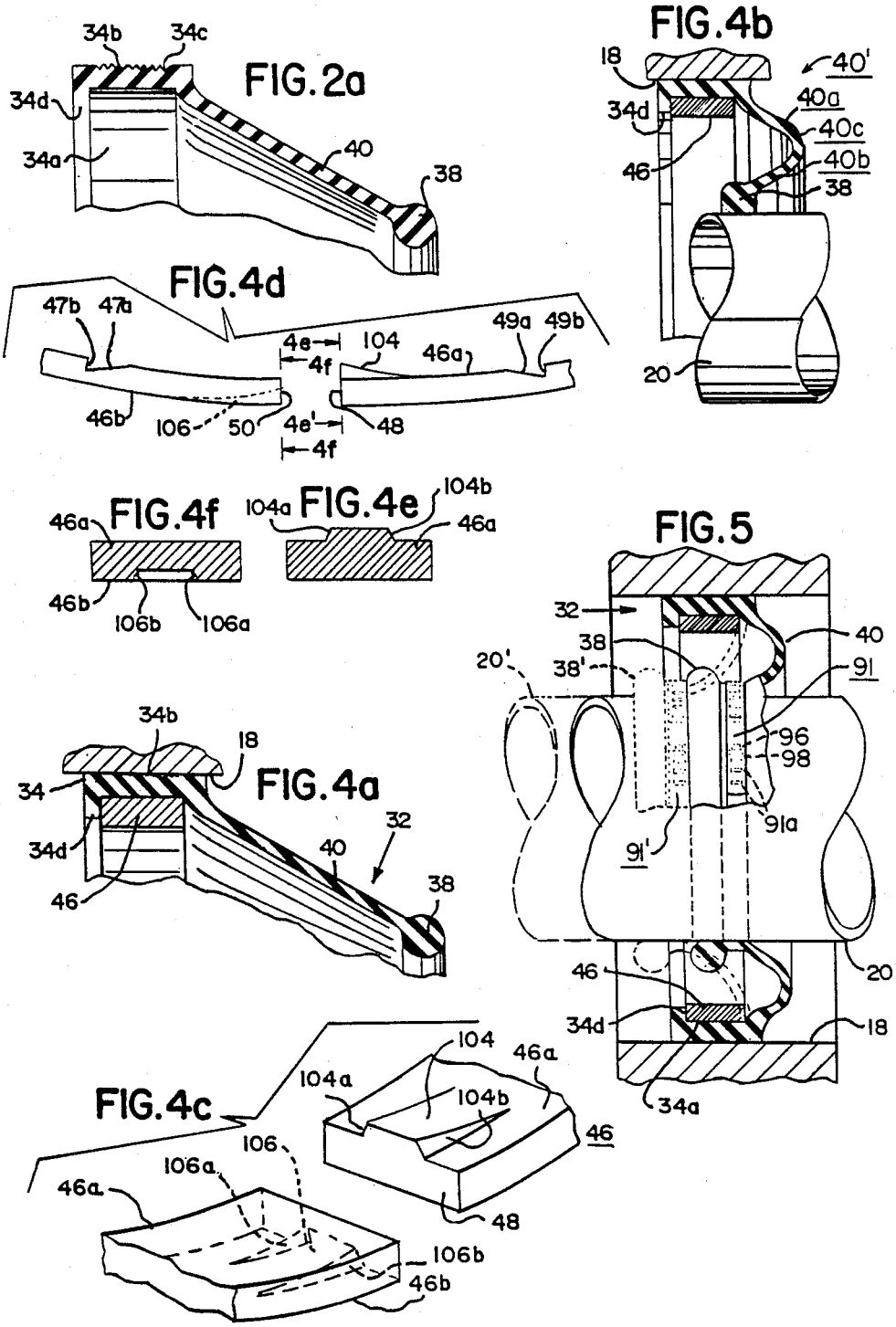

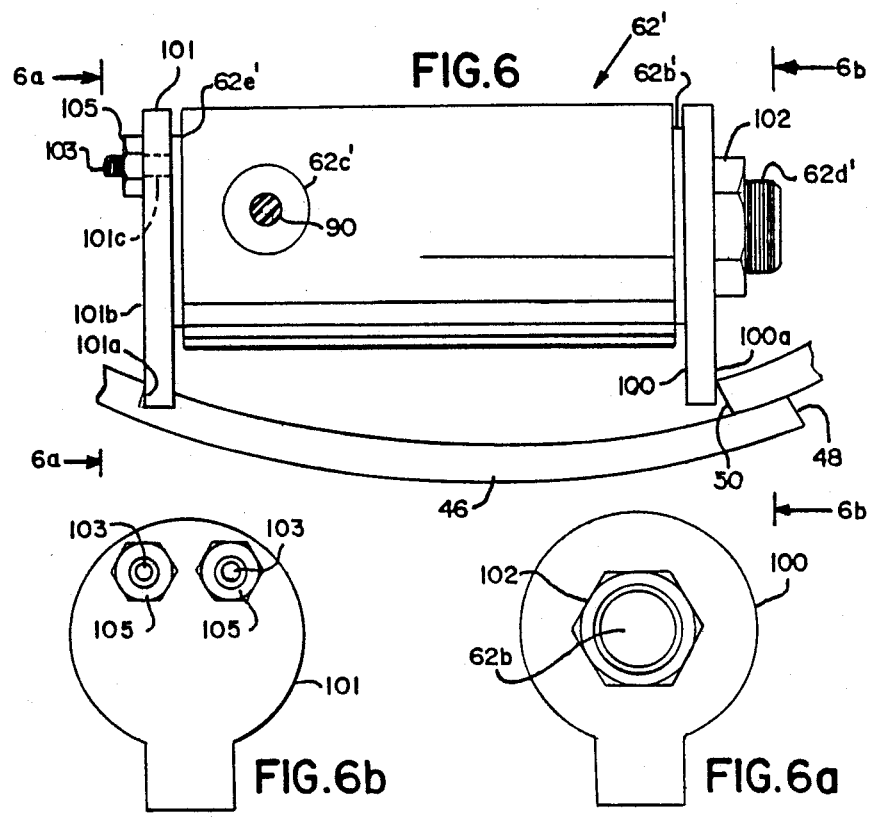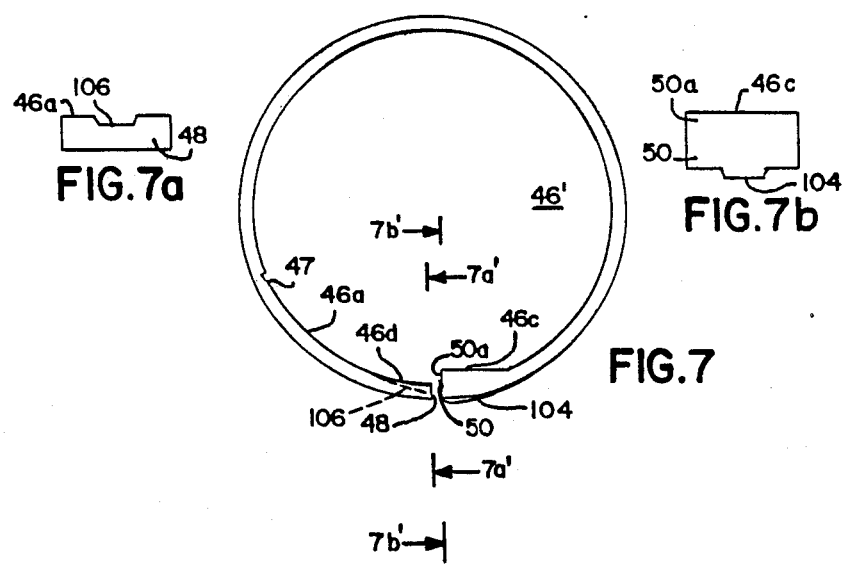

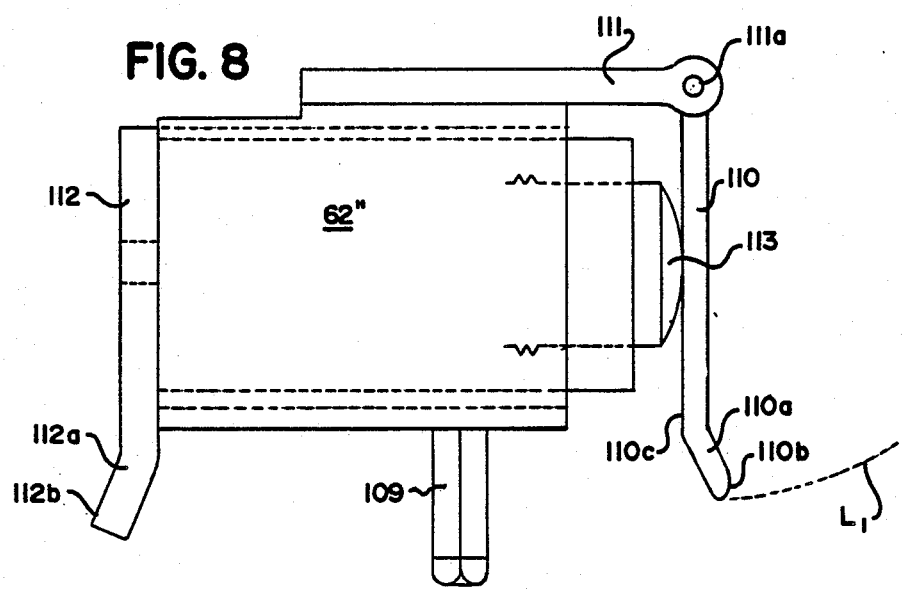
FIG. 8
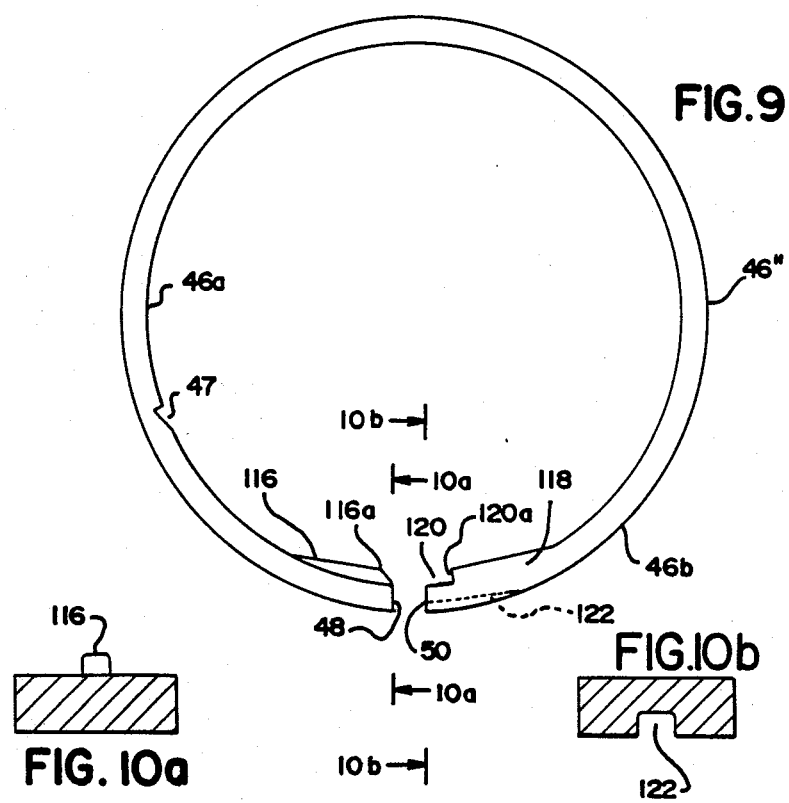
FIG. 9
FIG. 10a
FIG. 10b

APPARATUS FOR PROVIDING A WATERTIGHT SEAL FOR MANHOLE PIPE CONNECTIONS INCLUDING A FOLDABLE GASKET AND CLAMPING BAND ASSEMBLY AND EXPANSION MEANS FOR INSTALLING THE GASKET AND CLAMPING BAND ASSEMBLY

This is a division of application Ser. No. 778,690, filed Sept. 23, 1985, now U.S. Pat. No. 4,711,455, issued Dec. 8, 1987.

FIELD OF THE INVENTION

The present invention relates to method and apparatus for providing a watertight seal between a pipe and a manhole opening, and more particularly to a novel gasket assembly comprising a gasket and a clamping band for facilitating the assembly thereof and to the method of their assembly.

BACKGROUND OF THE INVENTION

Pipe runs for sewage systems and the like are terminated at predetermined intervals within manhole assemblies to facilitate maintenance, inspection and repair. A coupling seal is provided between the manhole opening and the pipe to provide a watertight seal therebetween and preferably to allow for some movement of the pipe relative to the manhole assembly, typically caused by external forces.

One technique for accomplishing this type of seal is described in U.S. Pat. Nos. 3,796,406; 3,813,107 and 3,832,438, assigned to the assignee of the present invention. This technique employs a gasket which has its outer periphery embedded in the concrete material during the time that the manhole member is cast. Although this type of gasket provides a good watertight seal between the manhole opening and pipe, the amount of movement which the pipe can experience relative to the manhole opening is quite limited, due to the nature of the gasket. Also, there are a number of applications wherein the gasket is inserted in situ.

The misalignment of a pipe relative to the manhole opening may be significant in certain applications and further since the pipe may undergo a significant amount of movement relative to the manhole as a result of subterranean influences, a gasket has been developed to accomodate significant changes in the displacement between the pipe and the manhole opening, which gasket and method of assembly is described in U.S. Pat. No. 4,103,901, issued Aug. 1, 1978 and assigned to the assignee of the present invention. The gasket disclosed in the last-mentioned patent is comprised of an outer peripheral flange which is embedded in the concrete material from which the manhole assembly is cast. The gasket is provided with a central opening defined by a gasket inner annular periphery shaped to have an appearance substantially similar to an O-ring, said gasket further including an integral, intermediate section having first and second diagonally aligned portions integrally joined at opposite ends to said outer flange and said inner periphery and integrally joined to one another along an imaginary circular line defining a V-shape with the fold being at the point joining the aforesaid portions. The gasket is arranged within the manhole opening such that the outer flange is embedded in the concrete surrounding said opening. The O-ring shaped inner periphery is sufficiently yieldable to embrace the outer surface of a pipe section extending therethrough. The intermediate section of the gasket is generally V-shaped to enable the gasket to resiliently support a pipe, ideally so that its longitudinal axis coincides with the axis of the manhole opening and yet which is sufficiently and readily yieldable to resiliently support the pipe relative to the manhole member and retain the watertight seal therebetween in spite of the fact that the pipe undergoes a significant displacement from the aforementioned concentric position within the manhole opening. This displacement may be of the order of several inches.

Although the above described gasket has the capability of accommodating pipes having an outer diameter which deviates from a nominal value over a significant range which is of the order of several inches and is further capable of maintaining a watertight seal between the pipe and the manhole opening in spite of an alignment displacement therebetween of the order of several inches, the above described gasket is designed to be embedded into the manhole base at the time that the base member is cast.

Many manhole bases, however, are cast independently of the sealing gasket. For example, some manhole bases are cast with no manhole openings or are cast with a smooth manhole opening, defined only by the cast material and having no sealing gasket.

U.S. Pat. No. 4,387,900 issued June 14, 1983 and assigned to the assignee of the present invention describes apparatus which provides all of the capabilities of the above mentioned sealing gasket and which is further capable of being installed in situ. The gasket assembly of U.S. Pat. No. 4,387,900 comprises a gasket member adapted to be fully contained within the manhole opening and comprises an annular outer flange substantially conforming to the size and shape of the manhole opening and initially loosely positioned therein. The gasket is provided with a smaller diameter central opening defined by an inner peripheral edge having an enlarged beaded cross-section, substantially conforming to an O-ring. An intergral, intermediate, generally V-shaped section is arranged between the outer flange and inner beaded periphery and includes two diagonally aligned annular portions integrally joined to one another along an imaginary annular fold line, said intermediate V-shaped section being yieldable and enhancing the ability of the gasket inner periphery, whose central axis normally coincides with the central axis of the outer flange, to be displaced therefrom by a significant displacement distance in order to position and support a pipe within the manhole opening to retain the integrity of the watertight seal therebetween in spite of the fact that the longitudinal axis of the pipe is displaced from the central axis of the manhole opening due to misalignment therebetween which may occur during initial installation or as a result of external influences acting upon the pipe.

The flange of the gasket is secured within the manhole opening by means of a circular compression or clamping band formed of a material which is impervious to corrosive type influences and is installed by means of an expansion assembly comprised of an annular shaped metal band having a discontinuity about its periphery to enable the band to be easily expanded. An hydraulically operated jack is pivotally coupled to the expandable band. The gasket clamping band is placed about the outer periphery of the expandable band, and these members are placed within the interior periphery of the gasket outer flange. The hydraulic jack is pressurized to expand the expandable band which in turn exerts an expansion force which is distributed substantially uniformly about the entire interior periphery of the clamping band, causing the clamping band to be expanded outwardly against the gasket outer flange whereupon the outer periphery of the flange is firmly pressed into intimate engagement with the manhole opening and the flange itself undergoes compression by the clamping band.

Expansion is complete when the hinged segment forming part of the clamping band fits into the gap between the ends of the clamping band. This gap length is predetermined for each standard hole size and assures the proper compression for watertightness. Other prior art techniques employ a pressure gauge for determining when compression is adequate for watertightness. The compression ring of the present invention is molded to exact size and utilizes the installation method described hereinabove.

The clamping band is also provided with a discontinuity to enable the clamping band to be expanded, and is further provided with a short, insertable segment defining one end of the discontinuity and which is hingedly connected to the major portion of the clamping band, preferably by a thin web of the clamping band material. The hinged connection is typically created by forming a cut or recess through the clamping band. The compression ring is preferably molded to exact size and includes a thin flexible section integrally joining the band and the segment to serve as a hinge located a spaced distance inward from one end of the discontinuity. The recess defining one side of the segment is of a depth sufficient to provide a thin web of material sufficient to create a hinged connection between the segment and the major body portion of the clamping band, enabling the segment to be swung away from the opposite end of the band defining said discontinuity in order to facilitate and simplify the loose positioning of the clamping band against the interior surface of the gasket outer flange.

The hydraulic jack is pressurized to expand the expandable metal band. When the gasket flange has been sufficiently compressed against the manhole opening, the insertable segment is swung up into the gap region formed by the discontinuity. Thereafter, the hydraulic pressure is relieved causing the compressed gasket flange to exert a counteracting force against the clamping band which, together with the insertable segment, serves to retain the clamping band in the locked position. The force exerted by the clamping band upon the compressed gasket flange creates and maintains a watertight seal between the outer flange of the gasket and the manhole opening.

The end of the pipe to be arranged within the manhole opening is pressed into the central opening of the gasket. The pipe opening O-ring shaped periphery has an unexpanded inner diameter which is less than the outer diameter of the pipe being pressed into the gasket. The O-ring shaped periphery is capable of expanding to accept the pipe and yet is of sufficient cross-section to exert a substantial holding force upon the pipe. In order to further enhance the watertight seal between the pipe and the gasket, an adjustable tension strap is positioned about the intermediate section of the gasket adjacent said O-ring periphery and is tightened to compress the portion of the gasket immediately adjacent the O-ring periphery firmly about the outer surface of the pipe to assure a watertight seal therebetween.

The gasket serves as a barrier, separating the clamping band and adjustable strap from the exterior of the manhole to shield the clamping band and the strap from external influences, to protect and perserve their useful operating life and to facilitate and simplify maintenance, inspection, repair and replacement thereof from the interior of the manhole assembly.

The clamping assembly of U.S. Pat. No. 4,387,900 has a disadvantage of imparting an expansion force indirectly to the clamping band through the frictional engagement between the expansion band and the clamping band. In addition, the hinged segment of the clamping band may easily be separated from the major portion of the clamping band thus rendering the clamping band ineffective and unusable.

The gasket design utilizing U.S. Pat. No. 4,387,900 further serves an impediment to the insertion, expansion and final clamping placement of the clamping band, thus complicating the operation. Also, the clamping band may become laterally displaced during expansion.

BRIEF DESCRIPTION OF THE INVENTION

The present invention is characterized by comprising a combination foldable gasket, clamping band and expansion assembly in which the design of the gasket does not impede the insertion and expansion of the clamping band to the final clamping position. The clamping band, in one embodiment, is designed with a plurality of recesses which cooperate with novel cleated members of an expansion jack assembly which directly applies expansion forces to the clamping band to facilitate the use of the present invention which is characterized by its ease of mounting and expansion. The design of the clamping band totally avoids the need for the hingedly connected segment of the clamping band described in U.S. Pat. No. 4,387,900 and hence eliminates all of its attendent disadvantages.

As another alternative embodiment of the present invention, the expansion jack is modified to include a pivotally mounted cleat assembly for engaging a cooperating groove provided along the interior periphery of one end of the clamping band and is provided with an abutting projection at its opposite end for engaging the end surface at the opposing end of the clamping band. The clamping band thus need only be provided with one set of grooves for receiving the cleats of the pivotally mounted member. The clamping band is otherwise clamped into position in the same manner as was previously described, whereupon the clamping band end engaging said projection, upon clearing the opposite end of the clamping band, snaps into place into the recess provided in the gasket and into firm engagement with the opposite end surface of the clamping band.

The clamping band is provided at one end with a tapered projection and at the other end with a tapered guide groove cooperating with and slidably receiving the tapered projection to prevent undesireable lateral movement of the band in the axial direction during expansion of the band.

In still another preferred embodiment, the expansion jack is provided with a swingably mounted arm whose free end engages a shoulder on the clamping band. The free end of the swingable arm moves along an arcuate-shaped path to follow the movement of and hence continuously engage the clamping band as it expands.

OBJECTS OF THE INVENTION AND BRIEF DESCRIPTION OF THE FIGURES

It is therefore one object of the present invention to provide a novel foldable gasket adapted for in situ installation within a manhole opening to provide a watertight seal between the manhole and the pipe inserted therein wherein the gasket is designed to retain the requisite watertight seal in spite of a significant displacement of the pipe from a desired concentric position with the manhole openings.

Still another object of the present invention is to provide a novel clamping assembly for use in clamping a gasket of the character described within the manhole opening which includes expandable clamping means and a method and apparatus for expanding and locking the clamping means against the gasket to obtain the desired watertight seal.

Still another object of the present invention is to provide a novel gasket and clamping band or the character described and further including novel expansion means for simple, straightforward and yet reliable installation of the clamping band, i.e. through the utilization of a hydraulically operated expansion jack which directly engages the clamping band for urging the clamping band into its locking position.

Still another object of the present invention is to provide a novel gasket assembly comprising a gasket and cooperating clamping band for clamping the gasket within a manhole opening, said band incorporating grooves for receiving cooperating projections of an expansion jack for clamping and locking the gasket in place and thereby maintaining the gasket flange in a compressed state within the manhole opening.

Still another object of the present invention is to provide a novel gasket assembly comprising a gasket and cooperating clamping band for clamping the gasket in position within the sidewall opening of a manhole base, for example, said gasket having a large diameter flange and smaller diameter ring and a tapered conical section joining said flange to said ring for holding said ring displaced from said flange during initial insertion into the sidewall opening and to facilitate insertion of the clamping band into the clamping band recess provided therefore, said tapered conical section being foldable to form a substantially V-shaped contour to move said ring into the confines of said sidewall opening and facilitate receipt and mounting of a steel clamping band.

Still another object of the present invention is to provide an expansion jack with a swingable arm whose free end moves along a curved path to assure positive and continuous engagement with the clamping band as it is expanded.

The above, as well as other objects of the present invention will become apparent when reading the accompanying description and drawing, in which:

FIG. 2a is an enlarged sectional view of the gasket of FIG. 2.

FIGS. 4a and 4b show sectional views of the gasket and clamping band and the developmental steps for mounting same.

FIG. 4c is a perspective view showing end portions of the clamping band provided with guide means for guiding the ends of the clamping band during expansion thereof.

FIG. 4d shows an end view of the end portions of the clamping band shown in FIG. 4c.

FIG. 4e shows an end view of a portion of the assembly of FIG. 4d looking in the direction of arrows 4e–4e'.

FIG. 4f shows an end view of a portion of the assembly of FIG. 4d looking in the direction of arrows 4f–4f'.

FIG. 5 is a sectional view of the gasket and clamping band of the present invention being fully installed and supporting a pipe within the manhole opening.

FIG. 6 shows a side view of another alternative embodiment for the expansion jack shown in FIG. 3a and further showing a modified clamping band usable with said modified expansion jack.

FIGS. 6a and 6b show end views of the driving plates mounted upon the ends of the expansion jack shown in FIG. 6.

FIG. 7 shows a side view of another clamping band for use with the expansion jack of FIG. 6.

FIG. 7a and 7b are end views of the ends of the clamping band of FIG. 7 looking in the direction of arrows 7a–7a' and 7b–7b' respectively.

FIG. 8 shows a side view of another preferred embodiment of the expansion jack.

FIG. 9 shows a side view of another clamping band preferably for use with the expansion jack of FIG. 8.

FIGS. 10a and 10b are end views of the ends of the clamping band of FIG. 9 looking in the direction of arrows 10a–10a' and 10b–10b', respectively.

DETAILED DESCRIPTION OF THE INVENTION AND THE PREFERRED EMBODIMENTS THEREOF

Figure 1:
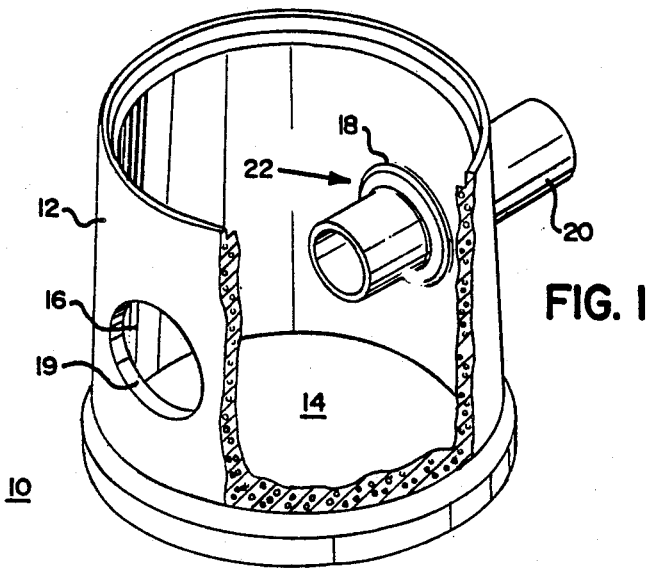
FIG. 1 is a perspective view of a manhole base having portions thereof partially broken away.

FIG. 1 shows a manhole base 10 comprised of a cylindrical-shaped sidewall 12 integrally joined at its lower end to a floor 14. The manhole base of FIG. 1 is further provided with a pair of openings 16, 18, each of which may be formed during casting of base 10. The manhole openings 16, 18 may alternatively be formed by conventional coring techniques. Each opening receives a pipe section such as, for example, a pipe section 20. The manhole base 10 may be entered for maintenance, inspection and repair purposes, as is well known.

Gasket assembly 22 is arranged between manhole opening 18 and pipe 20 to provide a yieldable, watertight seal therebetween.

Figure 2:
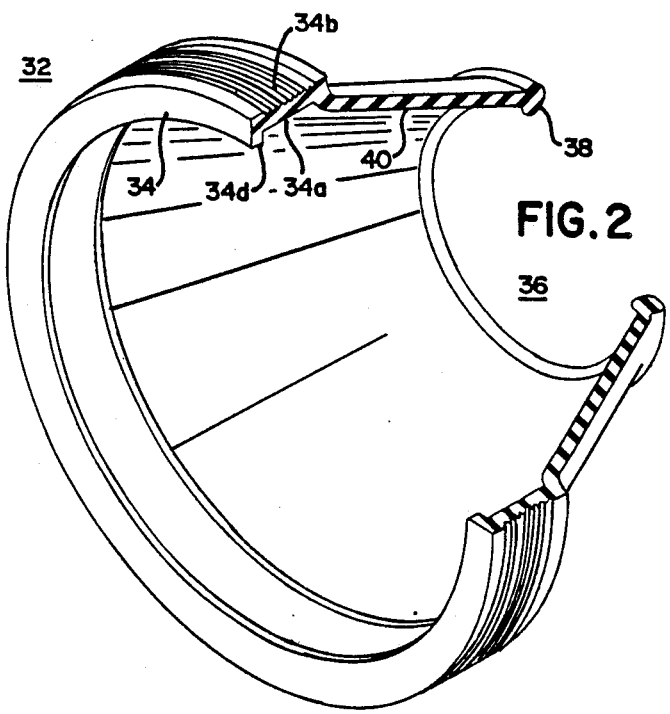
FIG. 2 is a perspective view of a gasket designed in accordance with the principles of the present invention and which is partially sectionalized.

Due to the difficulty of assuring that the pipe section and manhole opening are concentric, it is desirable to provide a gasket assembly 22 which compensates for deviations from concentricity of pipe 20 and opening 18, while, at the same time, assuring that an adequate watertight seal is maintained. To accomplish this, the present invention utilizes a gasket assembly shown, for example, in FIGS. 4b and 5. The gasket assembly is comprised of a gasket 32 and a clamping ring 46 arranged to be mounted within a manhole opening 18 in a manner to be more fully described. FIGS. 2 and 2a show the gasket 32 which is comprised of an outer annular flange 34. The central opening 36 is defined by an enlarged beaded periphery 38 having a circular cross-section and generally resembling an O-ring.

The intermediate section 40 of gasket 32 has a conical shape. The larger diameter end of section 40 is integrally joined to flange 34, while the smaller diameter end of section 40 is integrally joined to the beaded, i.e. O-ring portion 38.

Flange 34 has a recessed inner band supporting surface 34a and a ribbed outer periphery comprised a plurality outwardly directed, of V-shaped projections 34b spaced from one another to define V-shaped recesses 34c, which projections 34b may be compressed downwardly toward the main body of the flange 34 when in the clamped condition, to be described. The left-hand end of flange 34 extends radially inward, forming a lip 34d which serves as the left-hand end of recess 34a.

Figure 3:
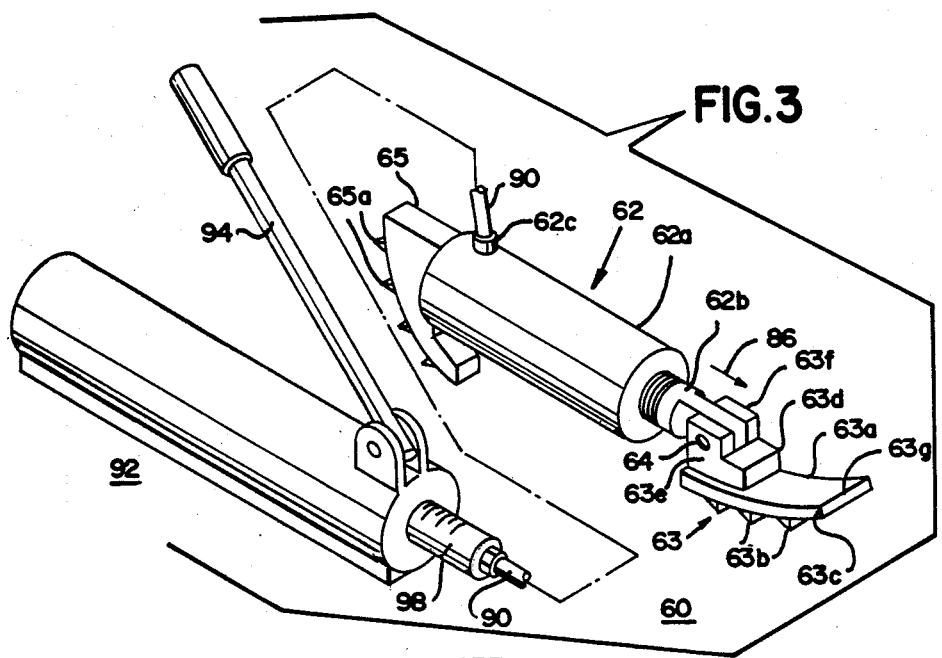
FIG. 3 is a perspective view showing the expansion jack utilized for locking the gasket of FIG. 2 within a manhole opening and further showing the apparatus for expanding the expansion jack in position.
Figure 3A:
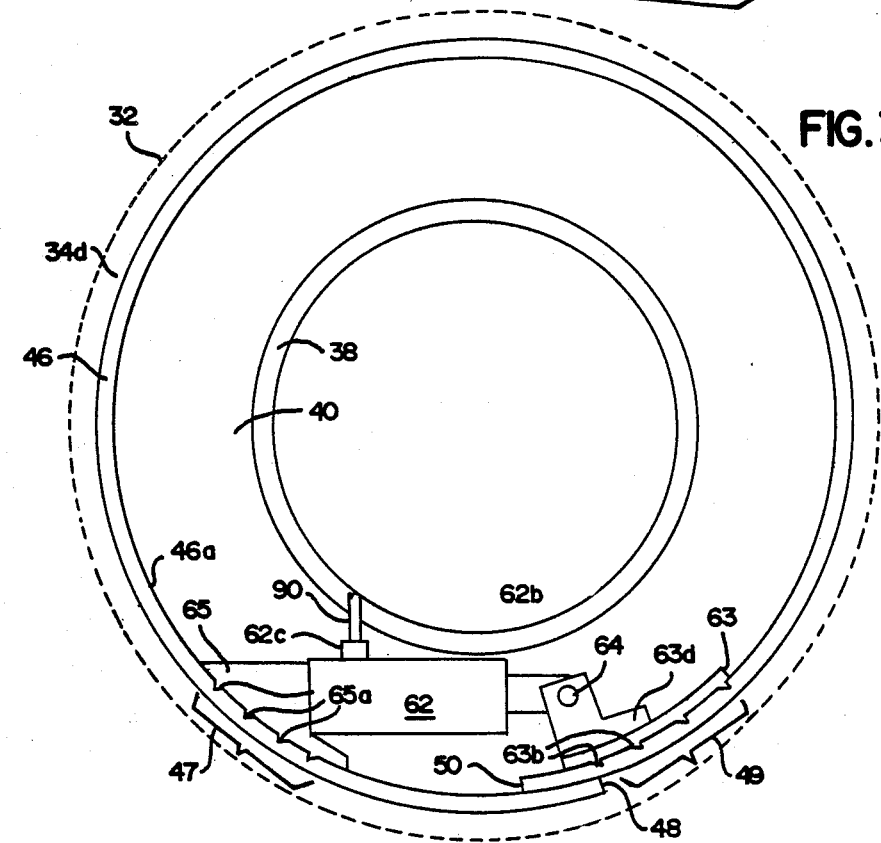
FIG. 3a is a side view showing the manner in which the expansion jack, compression ring and gasket are arranged for installation within the manhole opening.

FIGS. 3a and 4a shown the compression band 46 forming part of the gasket assembly 30. Noting especially FIG. 3a, the compression band 46 comprises a substantially circular-shaped band formed of a suitable plastic material such as polyvinylchloride (PVC), molded in a curved configuration to form band 46. The band, in one preferred embodiment, has a thickness T in the range of from 0.24 to 0.75 inches and a width W in the range of from 0.70 to 1.25 inches, with the preferred thickness range being 0.375 to 0.50 inches and the preferred width range being 0.75 to 1.15 inches. The band is preferably molded as a solid, continuous annular member which is cut to provide a discontinuity forming ends 48 and 50.

The concave major surface or inner periphery 46a of clamping band 46 is provided with a first group of substantially V-shaped recesses 47 near end 48 and a second group of V-shaped recesses 49 near end 50, as shown in FIG. 3a. The group of recesses 47 are substantially identical to one another. Likewise the group of recesses 49 are substantially identical to one another. One of the recesses 47 is shown in FIG. 4d as comprising a diagonally aligned wall 47a and a cooperating wall 47b which is substantially perpendicular to an imaginary line which is tangent to the inner periphery 46a of clamping band 46. In a similar manner, each recess 49 is provided with a diagonally aligned surface 49a and a cooperating surface 49b which is substantially perpendicular to an imaginary line which is tangent to the inner periphery 46a of clamping band 46.

The gasket assembly, comprised of gasket 32 and clamping band 46, is assembled into position within a manhole opening 18 and is watertightly sealed therein by means of the expansion apparatus 60, shown best in FIGS. 3 and 3a. The expansion apparatus 60 is comprised of an expansion jack 62 which includes a cylinder 62a housing a reciprocating piston (not shown) coupled to a piston rod 62b having a cleat assembly 63 hingedly connected thereto by hinge pin 64. Cleat assembly 63 includes a curved member 63a having a plurality of cleats, i.e. V-shaped projections 63b arranged on the convex surface 63c of curved member 63a. A block 63d is mounted upon the concave surface 63g of curved member 63a and is provided with a pair of bifurcated arms 63e, 63f. The free end of piston rod 62b is positioned between bifurcated arms 63e and 63f and all three of these members 62, 63e, 63f have coaligned openings for receiving pin 64.

The cylinder 62a is provided with a curved member 65 secured to the opposite end thereof and provided with a plurality of V-shaped projections or cleats 65a. The cleats 63b are shaped to conform to the shape of the grooves 47 and are arranged to rest therein in the manner shown in FIG. 3a. The cleats 65a have a shape conforming to the shape of the grooves 49 and are designed to be received by said grooves.

Hydraulic expansion jack 62 is provided with a coupling 62c for receiving supply tube 90 to drive piston rod 62b in the direction shown by arrow 86, causing piston rod 62b to be driven outwardly from cylinder 62a thereby moving the groups of cleats 63b and 65a apart to expand the clamping band 46.

As shown in FIG. 3, coupling opening 62c in hydraulic expansion jack 62 is coupled to a supply conduit in the form of a resilient hose 90 which delivers fluid pressure to hydraulic expansion jack 62 from hydraulic power unit 92, having manual operating handle 94 which is "pumped" to develop hydraulic pressure in line 90.

A gauge 98 may be coupled between the outlet opening 96 of hydraulic power unit 92 and flexible hose 90. The manner of installation of the gasket assembly 30 is as follows:

The gasket 32 is positioned within a manhole opening, such as, for example, manhole opening 18, in the sidewall 12 of a manhole base, shown, for example, in FIGS. 4a and 5. The diameter of the outer periphery of flange 34 is substantially the same as the diameter of the inner periphery of opening 18 and loosely rests against the surface of manhole opening 18. The clamping band 46 is positioned with one of its ends (48) overlapping the other (50) so that the inner periphery 46a of the clamping band (see FIGS. 3a and 4d) adjacent end 50 overlaps the outer periphery 46b of the portion of the clamping band adjacent to end 48, as is shown in FIG. 3a. The overlapping ends of the clamping band are moved apart by a distance sufficient so that the outer diameter of the clamping band is less than the inner diameter of inwardly directed lip 34d. The clamping band is then placed into the interior portion of flange 34 so that it is positioned generally within recess 34a as shown, for example, in FIG. 4a.

The expansion jack 62 is then placed upon the inner periphery of the clamping band with the cleats 63b inserted into grooves 47 and with the cleats 65a inserted into the grooves 49.

The operating handle 94 of hydraulic power unit 92 is operated to apply hydraulic pressure to hydraulic expansion jack 62 causing members 63, 65 thereof to move apart, thereby directly and positively expanding the band 46, causing the ends 48, 50, of clamping band 46 to be moved generally toward one another and causing the clamping band 46 to be pressed at least partially into surface 34a and wherein projections 34b are compressed and further serve to conform to and follow any irregularities in the surface of manhole opening 18, thereby assuring a good watertight seal therebetween. Expansion band 46 is expanded until end 48 clears end 50, at which time end 48 of clamping band 46 snaps radially outwardly and against recess 34a in outer flange 34. A release lock (not shown), provided as part of the hydraulic power unit 92 and which is conventionally provided in such power units, is actuated to relieve the hydraulic pressure whereupon the counteracting force of the compressed gasket flange 34 urges clamping band 46 inwardly. However, clamping band 46 does not experience any reduction in circumference due to the abutment of ends 48 and 50 against one another, thereby maintaining flange 34 under compression between clamping band 46 and the interior surface of manhole opening 18. This arrangement also avoids the need to expand band 46 and thereby compresses flange 34 beyond the desired level of compression as is the case with the gasket assembly of the prior art, thus eliminating the need for exerting unduly large forces upon band 46 and flange 34.

As will be noted from FIG. 4a, the configuration of gasket 32 is such that conical section 40 initially extends away from and is displaced from recess 34b, greatly facilitating the insertion of clamping band 46 as well as the insertion of expansion jack 62 into the hollow region defined by recess 34a.

After the clamping band 46 has been moved to the locked position described hereinabove, the gasket 32 is then readily and easily manipulated to move beaded end 38 from the position shown in FIG. 4a to the position shown in FIG. 4b thereby defining a generally V-shaped contour comprised of a first portion 40a extending diagonally downward and to the right from flange 34 and a second portion 40b extending downwardly and to the left from bend 40c and terminating in beaded end 38. The gasket retains this position, and is now ready to receive a connecting pipe.

The O-ring shaped or beaded portion 38 of gasket 32 has an appreciable mass which is somewhat yieldable upon insertion of the end 20a of pipe section 20. For example, a pipe having an inner diameter of 8 inches may have an outer diameter of as little as 8.25 inches or as great as 10.25 inches. O-ring shaped portion 38 is sufficiently yieldable to accommodate a pipe outer diameter within the aforementioned range and yet provide a good seal therebetween. Pipe section 20 is assembled by placing end 20a, which is on the exterior side of manhole base 10, adjacent to opening 18 and substantially in alignment with O-ring portion 38, see FIG. 4b. End 20a is then pressed into the central opening 36, causing O-ring portion 38 to yield by an amount sufficient to receive and accommodate the outer diameter of pipe 20. The end of pipe 20 and the beaded portion 38 may be lubricated with a lubricant compatible with the material of the gasket to facilitate insertion of the pipe 20. Normally, the inner diameter of O-ring portion 38 is at least slightly less than the smallest outer diameter of the pipe section 20, causing the O-ring portion 38 to experience some expansion, even when receiving a pipe section 20 having an outer diameter at the low end of the above-mentioned dimensional range.

The expansion of O-ring portion 38 causes the fold 40c of V-shaped section 40' to sharpen. (See FIG. 4b) The gasket intermediate V-shaped section 40 ' is designed to substantially freely yield in a controlled manner to provide for the expansion of central opening 36, as well as to yield radially as a result of displacement of the longitudinal axis 20b of pipe section 20 away from the central axis of manhole opening 18. For this reason, the diameter of manhole opening 18 is sufficient to allow for a displacement of the pipe longitudinal axis 20b several inches away from the central axis of manhole opening 18. In one example, for an application in which a manhole base 10 is adapted to receive a drainage pipe, whose outer diameter may be as small as 8.25 inches or as large as 10.25 inches, the diameter of manhole opening 18 is of the order of 12 inches allowing for a deviation from concentricity of from 1.75 to 3.75 inches.

The nominal clearance between the outer periphery of gasket flange 34 and the manhole opening 18 is of the order of 0.25 inches upon initial insertion and prior to expansion. The manhole opening 18 is normally fairly dimensionally precise. However, when coring an opening in the sidewall 12 of manhole 10, the coring device may strike a metal reinforcing member 19, see FIG. 1, typically employed for structural reinforcement of the manhole base 10, causing the coring device to vibrate during the coring operation, which results in the forming of a cored opening which can deviate as much as 0.5 inches in diameter from the desired manhole opening. In such instances, a larger clamping band 46 may be utilized.

The proper positioning and compression of gasket 32 and clamping ring 46 may be determined by reading the gauge 98. In one example, when the gauge reaches a reading of 4000 pounds pressure, which indicates the desired amount of compression, further expansion is terminated and the end 48 of clamping band 46 is snapped into recess 34a to retain the clamping ring 46 in the clamped position.

As was mentioned hereinabove, even though the cored opening may differ by as much as ±0.5 inches in diameter, gasket 32 is sufficiently resilient to accommodate the manhole opening within the aforementioned range and still provide and maintain an excellent Watertight seal between the pipe section 20 and the manhole base 10.

The ends 48, 50 of clamping band 46 need only be substantially flat and coplanar to assure proper clamping of band 46, thereby assuring that equal and opposite forces will be exerted between the clamping band 46 and the compressed gasket flange 34, substantially uniformly about the entire 360 degrees of the clamping band 46 and gasket flange 34. FIG. 4 shows a simplified sectional view of the gasket assembly 30 with the gasket flange 34 in the compressed state and with the clamping band 46 in the clamped position, for retaining gasket flange 34 under compression.

In order to further enhance the watertight seal between gasket 32 and pipe section 20, a tension band 91 is positioned about a portion of the web 40b adjacent to O-ring portion 38. Adjusting screw 96 is rotated within housing 98 which causes the threads of adjusting screw 96 to engage slots 91a formed in tension band 91 to tighten the tension band 91 and hold the portion of web 40b adjacent to O-ring portion 38 under compression against the outer surface of pipe section 20. Web 40b normally extends away from the outer surface of pipe 20. Tension band 91 pulls a portion of the web beneath the band downwardly against the pipe surface.

In order to facilitate the insertion and tightening of tension strap 91, pipe section 20 is moved toward the left relative to FIG. 5, moving the O-ring section to the dotted line position 38', thereby positioning tension strap 91 in the dotted line position 91', simplifying the mounting of tension strap 91 and making it easier to gain access to a conventional adjusting screw (not shown) for suitably tightening tension strap 91. Thereafter, the pipe section 20 may be moved toward the right relative to FIG. 5, whereupon the O-ring portion 38 moves back to the solid line position 38. In this position, it can clearly be seen that both the clamping band 46 and tension strap 91 are arranged within the interior of manhole base 10. Manhole base 10, gasket 32 and pipe 20 serve to shield clamping band 46 and tension strap 91 from being subjected to any of the environmental influences external of manhole 10, such as surface water or other liquids which may percolate through the ground. The clamping band 46, as was mentioned hereinabove, is formed of a plastic material, such as PVC, which is impervious to such corrosive influences. The gasket 32 is preferably formed of polyisoprene, neoprene or EPDM, or may be formed of any other suitable material which may either be natural rubber or a rubber-like synthetic material having the properties of natural rubber. The preferred materials set forth hereinabove exhibit excellent resistance to ozone and ultraviolet radiation and have good tear resistance.

As another alternative embodiment to the expansion jack 62 shown, for example, in FIG. 3 and the clamping band 46, FIG. 6 shows an expansion jack 62′ utilizing plate 100 in place of the cleat assembly 65 shown in FIG. 3. Plate 100 is secured to piston rod by fastening nut 102 threadedly engaging the threaded portion 62d′ of piston rod 62b′. Surface 100a of plate 100 rests against end 50 of clamping band 46 as shown in FIG. 6. Plate 101 is secured to end 62e′ of expansion jack 62′. Edge 101a is seated in groove 47. Surface 101b drives against surface 47b of groove 47 and surface 100a drives against end 50. If desired, surface 100a may be placed in one of the grooves 49.

Installation of the alternative embodiment of the gasket assembly is as follows:

Gasket 32 is placed within the sidewall opening 18 in the same manner as was previously described, with the tapered section 40 extending toward the exterior of the manhole base.

The clamping band 46 is positioned so that the end 48 is positioned outside of the end 50. The ends 48 and 50 of clamping band 46 are moved apart until the outer diameter of the clamping band is smaller than the inner diameter of lip 34d (see FIG. 2a). The clamping band is then positioned within recess 34a and is loosely held in this position.

Expansion jack 62′ is positioned against band 46 in the manner shown in FIG. 6 and described hereinabove. The operating handle 94 of hydraulic power unit 92 is manipulated to introduce air under pressure into expansion jack 62′ through conduit 90, moving members 100 and 101 apart, thereby directly causing expansion of clamping band 46, by application of circumferential forces.

As soon as the end 50 moves an amount sufficient to clear end 48, end 50 snaps radially outward and into recess 34a. The release valve (not shown) of the hydraulic power unit 92 is operated to contract expansion jack 62′. However, since ends 48 and 50 of clamping band 46 abut one another, the clamping band 46 remains in the locked position and maintains gasket flange 34 under compression to provide a good watertight seal between flange 34 and sidewall opening 18.

FIGS. 4c through 4f show guide means respectively provided along the inner periphery 46a of clamping band 46 adjacent end 48 and provided along the outer periphery 46b of clamping band 46 adjacent end 50. The guide means comprises a tapering projection 104 which slopes downwardly from end 48 to surface 46a and has a truncated triangular cross-section, to cooperate with a similarly shaped tapered recess 106 so that the tapered projection 104 is received within the tapered recess 106 when the ends 48, 50 are overlapped in the manner shown, for example, in FIG. 3a. Although the projection 104 is shown as being arranged along the inner periphery 46a of clamping band 46 and the tapered recess 106 is shown as being provided along the outer periphery 46b of clamping band 46, it should be understood that these cooperating portions may be reversed.

Thus, for example, tapered projection 104 may be positioned adjacent end 50 and tapered recess 106 may be positioned adjacent end 48. Also the tapered projection may be positioned along the outer surface 46b and the tapered groove may be positioned along surface 46a.

The cooperating tapered projection 104 and tapered recess 106 serve as cooperating guides to prevent the ends 48, 50 of the clamping band 46 from being laterally displaced during the time that the clamping band 46 is being expanded radially outwardly into recess 34a of outer flange 34. This arrangement also prevents the installer from being injured.

The manner in which these cooperating members 104, 106 function is as follows:

In the embodiment shown in FIG. 4c, the end 48 of clamping band 46 is positioned so that the portion of the inner periphery 46a adjacent end 48 rests against the outer periphery portion 46b of clamping band 46 adjacent end 50. As the clamping band expands, projection 104 enters into recess 106 permitting the ends 48 and 50 of clamping band 46 to freely move closer to one another while substantially preventing any lateral displacement of the ends of the clamping band in the axial direction due to the positioning of tapered projection 104 within tapered recess 106. The sloping sidewalls 104a and 104b of tapered projection 104 and the sloping sidewalls 106a and 106b of tapered recess 106 facilitate the entry of projection 104 into recess 106.

As soon as ends 48 and 50 are clear of one another, end 50 snaps radially outwardly and into recess 34a. The ends 48 and 50 abut one another when the expansion jack is removed to maintain clamping band 46 in the locked position and thereby to maintain resilient compressible outer flange 34 under compression.

FIG. 7 shows an alternative clamping member 46′ provided with a groove 47 along the interior surface 46a a spaced distance inward from end 48. A recess 106 having a configuration similar to the recess 106 shown in FIGS. 4c and 4f is provided along surface 46a and extending to end 48. FIG. 7a shows a view of end 48 and recess 106.

The end portion 50 of clamping member 46′ has increasingly larger thickness so that its upper portion 50a extends above the inner surface of end 48 whereby the end surface portion 46c is spaced from the end surface portion 46d when the clamping member 46′ is in the locked position with ends 48 and 50 abutting one another.

The manner in which clamping band 46′ functions is similar to the clamping band 46 shown in FIGS. 4c through 4f, which operation is as follows:

The ends of clamping band 46′ are overlapped so that outer periphery 46b adjacent end 50 engages the inner periphery 46a adjacent the end 48. The ends 48 and 50 are moved apart from one another to reduce the diameter of clamping band 46′ by an amount sufficient to permit easy entry of clamping band 46′ into the interior of gasket 32. Clamping band 46′ is positioned within recess 34a. Expansion jack 62′ shown in FIG. 6 is placed upon the clamping band with edge 104a seated in recess 47 and with surface 100a engaging end 50. The hydraulic unit 92 is operated to move end plates 100 and 101 apart causing end 50 to move toward end 48. When end 50 clears end 48, end 50 snaps outwardly and into position abutting end 48. The enlarged portion 50a extends beyond end 48 assuring engagement with plate 100 even after the end 50 is snapped into the locked position.

Cooperating tapered projection 104 and tapered slot 106 prevent ends 50 and 48 from experiencing any lateral movement in the axial direction during the expansion of clamp 46' to move the clamp into the locked position.

In the event that the separation distance between end 50 and recess 47 is too large, a spacing shim or plate or a plurality of such shims or plates (not shown) may be placed between plate 101 and the adjacent ends 62e' of expansion jack 62', as shown in FIG. 6. Plate 101 may then be replaced upon expansion jack 62' with openings 101c receiving threaded members 103. Threaded nuts 105 secure plate 101 and the spacing shims to the housing expansion jack 62'.

FIGS. 9. 10a and 10b show an alternative clamping member 46" for use with expansion jack 62" (FIG. 8) and provided with a groove 47 along the interior surface 46a, a spaced distance inward from end 48. A narrow projection 116 is provided along surface 46a and extends to end 48. FIG. 10a shows a view of end 48 and projection 116, which is provided with a bevelled end 116a forming an angle of the order of 45° with end 48.

The end portion of clamping member 46" opposite end 48 has an increasingly larger thickness as shown at 118. The enlarged thickness portion 118 is set in from end 58, forming a notch 120 including shoulder 120a. Shoulder 120a is spaced above the end surface portion 46d when the clamping member 46" is in the locked position with ends 48 and 50 abutting one another. A narrow groove 122 is provided along outer surface 46b and extends inwardly from end 50 and cooperates with projection 116 which will be more fully described. The base of groove 122 and the free end of projection 116 are rounded to facilitate free relative movement therebetween.

FIG. 8 shows an alternative expansion jack 62" comprised of a swingable plate 110 pivotally mounted to plate 111 by pin 111a. Plate 111 is preferably welded to the housing of expansion jack 62". The free end of plate 110 is bent to form a diagonally aligned integral end portion 110a having engaging surface 110b.

A piston rod 113 has a dome-shaped end 113a which engages surface 110c of plate 110 to swing plate 110 outwardly so that surface 110b moves along a curved path shown by dotted line $L_1$.

Plate 112 is secured to the opposite end of the expansion jack housing and is provided with an integral diagonally aligned free end portion 112a having an engaging surface 112b.

The manner in which clamping band 46" functions is similar to the clamping bands 46 and 46' in FIGS. 4c through 4f and 7 through 7b, which operation is as follows:

The ends of clamping band 46" are overlapped so that outer periphery 46b adjacent end 50 engages the inner periphery 46a adjacent the end 48. The ends 48 and 50 are then moved apart from one anther to reduce the diameter of clamping band 46" by an amount sufficient to permit its easy entry into the interior of gasket 32. Clamping band 46" is then positioned within recess 34a. Expansion jack 62" shown in FIG. 8 is placed upon the clamping band with edge 112a seated in recess 47 and with surface 110b of swingable plate 110 engaging should 120a. The hydraulic unit 92, which is connected to coupling 109, is operated to move piston rod 113 outwardly. The dome-shaped end 113a of piston rod 113 engages swingable plate 110 swinging it outwardly so that surface 110b moves along the curved path shown by dotted line $L_1$. The ends of plates 110 and 112 are thus moved apart, causing end 50 to move toward end 48. When end 50 clears end 48, end 50 snaps outwardly against gasket 32 and into position abutting 48. Shoulder 120a extends above end 48, assuring engagement with surface 110a of swingable plate 110 even after the end 50 is snapped into the locked position with end 48. Cooperating projection 116 and slot 122 prevent ends 50 and 48 from experiencing any lateral movement during the expansion of clamp 46" towards the locked position. The increased surface area of the smooth engaging surfaces 46a and 46b, facilitate movement of the ends 48 and 50 of clamping band 46" to the clamped position. The swingable movement of plate 110, so that its free end follows curved path $L_1$, assures that surface 110b remains in continuous contact with shoulder 120a as the clamping band 46" expands.

A latitude of modification, change and substitution is intended in the foregoing disclosure, and in some instances, some features of the invention will be employed without a corresponding use of other features. For example, the plates 100 and 101 in FIG. 6 may be lengthened and the expansion jack may be located external to the clamping band 46 and gasket 32. The expansion jack may be set at an angle perpendicular to that shown in FIG. 6 so that side of plates 100, 101 engage end 50 and groove 47, respectively. Accordingly, it is appropriate that the appended claims be construed broadly and in a manner consistent with the spirit and scope of the invention herein.

A latitude of modification, change and sustitution is intended in the foregoining disclosure, and in some instances, some features of the invention will be employed without a corresponding use of other features Accordingly, it is appropriate that the appended claims be construed broadly and in a manner consistent with the spirit and scope of the invention herein.

What is claimed is:

1. In combination, a gasket assembly for resiliently supporting a pipe within an opening having an annular surface for supporting the gasket assembly and for sealing the annular region between the outer surface of the pipe and the surface of the opening, and an expansion assembly for installing said gasket assembly, comprising:

a gasket formed of a resilient, compressible material and having an outer flange adapted to be positioned against the surface of the opening;

said gasket having a pipe receiving portion defined by an annular-shaped peripheral portion of substantially circular cross-section forming a pipe opening;

the diameter of the outer flange being greater than the diameter of said pipe receiving portion;

an intermediate, conical-shaped section normally axially displacing said outer flange from said annular-shaped peripheral portion prior to installation and being foldable after insertion and placement of the outer flange upon the gasket supporting surface of said opening and before insertion of said pipe into said pipe receiving portion to axially move said annular peripheral portion into the confines of said first mentioned opening whereby, after movement of said annular peripheral portion into the confines of said first mentioned opening, said conical-shaped section assumes a substantially V-shaped contour defined by a first portion sloping downwardly and away from said outer flange and a second portion sloping upwardly and away from said annular peripheral portion with said first and second portions of said conical section being joined to form a curved contour at said fold, said pipe receiving portion lying within said opening;

an annular clamping band formed of a plastic material substantially impervious to corrosive influences normally encountered in sewage systems and arranged to be positioned to engage the inner periphery of said outer flange;

said clamping band being of substantially uniform thickness and resiliency over its entire length and having a discontinuity to define first and second free ends thereof, whereby said first and second ends are moved into abutment with one another when the clamping band is expanded against said outer flange to lock said clamping band into the locked position and maintain said outer flange under compression, the interactive forces between the compressed flange and the clamping band serving to retain the clamping band in the locked position against the inner periphery of said outer flange, the outer periphery of said outer flange being pressed into intimate engagement with the gasket supporting surface of said first mentioned opening;

said clamping band being expanded and said gasket flange being compressed and its outer surface being urged against the surface of said opening by means of said expansion assembly positioned within the hollow region surrounded by said clamping band;

said expansion assembly comprising expansion jack means having first and second elongated projection means at opposing ends of the expansion jack means and displaceably movable apart from one another upon the application of pressure to said expansion jack; and said clamping band including first and second elongated projection receiving means for receiving and positioning said elongated projection means whereby the first and second projection means of the expansion assembly engage and apply circumferential expanding forces directly to said clamping band for expanding said clamping band and locking said clamping band into position with the ends of said band in abutment and said band lying within the recess of the inner periphery of said outer flange;

one of said projection means comprising a swingable arm whose free end engages one of said first and second receiving means and moves along a curved path as the expansion jack expands so that said projection means follow the movement of the said first and second receiving means as the clamping band is expanded.

2. In combination, a gasket assembly for resiliently supporting a pipe within an opening having an annular surface for supporting the gasket assembly and for sealing the annular region between the outer surface of the pipe and the surface of the opening, and an expansion assembly for installing said gasket assembly, comprising:

a gasket formed of a resilient, compressible material and having an outer flange adapted to be positioned against the surface of the opening;

said gasket having a pipe receiving portion defined by an annular-shaped peripheral portion of substantially circular cross-section forming a pipe opening; the diameter of the outer flange being greater than the diameter of said pipe receiving portion;

an intermediate, conical-shaped section normally axially displacing said outer flange from said annular-shaped peripheral portion prior to installation and being foldable after insertion and placement of the outer flange upon the gasket supporting surface of said opening and before insertion of said pipe into said pipe receiving portion to axially move said annular peripheral portion into the confines of said first mentioned opening whereby, after movement of said annular peripheral portion into the confines of said first mentioned opening, said conical-shaped section assumes a substantially V-shaped contour defined by a first portion sloping downwardly and away from said outer flange and a second portion sloping upwardly and away from said annular peripheral portion with said first and second portions of said conical section being joined to form a curved contour at said fold, said pipe receiving portion lying within said opening;

an annular clamping band formed of a plastic material substantially impervious to corrosive influences normally encountered in sewage systems and arranged to be positioned to engage the inner periphery of said outer flange;

said clamping band being of substantially uniform thickness and resiliency over its entire length and having a discontinuity to define first and second free ends thereof, whereby said first and second ends are moved into abutment with one another when the clamping band is expanded against said outer flange to lock said clamping band into the locked position and maintain said outer flange under compression, the interactive forces between the compressed flange and the clamping band serving to retain the clamping band in the locked position against the inner periphery of said outer flange, the outer periphery of said outer flange being pressed into intimate engagement with the gasket supporting surface of said first mentioned opening;

said clamping band being expanded and said gasket flange being compressed and its outer surface being urged against the surface of said opening by means of said expansion assembly positioned within the hollow region surrounded by said clamping band;

said expansion assembly comprising expansion jack means having first and second elongated projection means at opposing ends of the expansion jack means and displaceably movable apart from one another upon the application of pressure to said expansion jack;

said clamping band including first and second elongated projection receiving means for respectively receiving and positioning said first and second elongated projection means whereby the first and second projection means of the expansion assembly engage and apply circumferential expanding forces directly to said clamping band for expanding said clamping band and locking said clamping band into position with the ends of said band in abutment and said band lying within the recess of the inner periphery of said outer flange; and said first and second projection means being elongated and the interior concave periphery of said clamping band being provided with said first and second projection receiving means each comprising an elongated groove extending in a direction parallel to the axis of said opening for respectively receiving and positioning the first and second elongated projecting means for expanding the band to the locked position; said grooves being substantially V-shaped and having one sidewall arranged substantially perpendicular to the interior periphery of the clamping band, the second sidewall being diagonally aligned relative to the interior periphery of said clamping band.

3. In combination, a gasket assembly for resiliently supporting a pipe within an opening having an annular surface for supporting the gasket assembly and for sealing the annular region between the outer surface of the pipe and the surface of the opening, and an expansion assembly for installing aid gasket assembly, comprising:

a gasket formed of a resilient, compressible material and having an outer flange adapted to be positioned against the surface of the opening;

said gasket having a pipe receiving portion defined by an annular-shaped peripheral portion of substantially circular cross-section forming a pipe opening;

the diameter of the outer flange being greater than the diameter of said pipe receiving portion;

an intermediate, conical-shaped section normally axially displacing said outer flange from said annular-shaped peripheral portion prior to installation and being foldable after insertion and placement of the outer flange upon the gasket supporting surface of said opening and before insertion of said pipe into said pipe receiving portion to axially move said annular peripheral portion into the confines of said first mentioned opening whereby, after movement of said annular peripheral portion into the confines of said first mentioned opening, said conical-shaped section assumes a substantially V-shaped contour defined by a first portion sloping downwardly and away from said outer flange and a second portion sloping upwardly and away from said annular peripheral portion with said first and second portions of said conical section being joined to form a curved contour at said fold, said pipe receiving portion lying within said opening;

an annular clamping band formed of a plastic material substantially impervious to corrosive influences normally encountered in sewage systems and arranged to be positioned to engage the inner periphery of said outer flange;

said clamping band being of substantially uniform thickness and resiliency over its entire length and having a discontinuity to define first and second free ends thereof, whereby said first and second ends are moved into abutment with one another when the clamping band is expanded against said outer flange to lock said clamping band into the locked position and maintain said outer flange under compression, the interactive forces between the compressed flange and the clamping band serving to retain the clamping flange, the outer periphery of said outer flange being pressed into intimate engagement with the gasket supporting surface of said first mentioned opening;

said clamping band being expanded and said gasket flange being compressed and its outer surface being urged against the surface of said opening by means of said expansion assembly positioned within the hollow region surrounded by said clamping band;

said expansion assembly including an expansion jack comprised of a cylinder housing and a reciprocating piston;

a piston rod coupled to said piston and extending outwardly from one end of said cylinder;

a first elongated member having first and second ends, one end being pivotally mounted to said cylinder housing, an intermediate portion of said first member being slidably engaged by the free end of said piston rod;

a second member rigidly connected to the end of said cylinder opposite said piston rod;

said first and second members each being provided with at least one projection at their free ends; and each of said projections being of a size and shape adapted to be received n a cooperating groove provided along the inner periphery of said clamping band adjacent one end thereof.

4. In a combination, a gasket assembly for providing a water-tight seal with an opening having a surface for supporting the gasket assembly and an expansion means for installing said gasket assembly, comprising:

a substantially tubular-shaped gasket having a hollow interior and being, formed of a resilient compressible material and having an end portion adapted to be positioned against the surface of the opening;

an annular clamping band formed of a material substantially impervious to corrosive influenced normally encountered in sewage systems and arranged to be positioned against the inner periphery of the end portion positioned within said opening;

said band having a discontinuity to define first and second ends thereof;

said first and second ends being positionable in abutting relationship to lock the band against the outer flange and maintaining the outer flange under compression between said band and said gasket supporting surface;

said band encircling a hollow region when said first and second ends are in abutting relationship;

said expansion means being releasably positioned within the hollow region surrounded by said clamping band for expanding the clamping band outwardly and against the outer flange so that substantially all of said expansion means is in said hollow region;

said expansion means including first and second member engaging the clamping band and means for moving said first and second members apart;

said first and second members having projections with elongated ends engaging the clamping band for expanding the clamping band when the first and second members are moved apart; the inner periphery of the band being provided with first and second elongated grooves each arranged a spaced distance inward from said first and second ends, at least one of said grooves receiving the elongated end of one of said projections.

5. The gasket assembly of claim 4 wherein said expansion means comprises an expansion jack for moving said first and second members apart; said expansion jack comprising a cylinder;

a piston arranged for reciprocating movement in the cylinder;

a piston rod coupled to said piston and extending outwardly from said piston and beyond one end of said cylinder;

one of said first and second members being pivotally coupled to said piston rod;

the remaining one of said first and second members being coupled to said cylinder.

6. In combination, a gasket assembly for providing a water-tight seal with an opening having a surface for supporting the gasket assembly, and an expansion means for installing said gasket assembly, comprising:

a substantially tubular-shaped gasket having a hollow interior and being formed of a resilient compressible material and having an end portion adapted to be positioned against the surface of the opening;

an annular clamping band formed of a material substantially impervious to corrosive influences normally encountered in sewage systems and arranged to be positioned against the inner periphery of the end portion positioned within said opening;

said band having a discontinuity to define first and second ends thereof;

said first and second ends being positionable in abutting relationship to lock the band against the outer flange and maintaining the outer flange under compression between said band and said gasket supporting surface;

said band encircling a hollow region when said first and second ends are in abutting relationship;

said expansion means being releasably positioned within said clamping band for expanding the clamping band outwardly and against the outer flange so that substantially all of said expansion means is in said hollow region;

said expansion means including first and second members engaging the clamping band and means for moving said first and second members apart;

said first and second members having projections engaging the clamping band for expanding the clamping band when the first and second members are moved apart; the inner periphery of the band being provided with first and second elongated grooves each arranged a spaced distance inward from said first and second ends, at least one of said grooves receiving one of said projections; and said grooves being V-shaped and having one surface perpendicular to an imaginary line tangent to the inner periphery of the clamping band and a surface diagonally aligned relative to the inner periphery of the clamping band; said one surface being more remote from the adjacent end surface of the clamping band than said diagonally aligned surface.

7. The gasket assembly of claim 6 wherein said projections have a size and shape conforming to the grooves in said clamping band.

8. In combination, a gasket assembly for providing a water-tight seal with an opening having a surface for supporting the gasket assembly, and an expansion means for installing said gasket assembly, comprising:

a substantially tubular-shaped gasket formed of a resilient compressible material and having an end portion adapted to be positioned against the surface of the opening;

an annular clamping band formed of a material substantially impervious to corrosive influences normally encountered in sewage systems and arranged to be positioned against the inner periphery of the end portion position within said opening;

said band having a discontinuity to define first and second ends thereof;

said first and second ends being positionable in abutting relationship to lock the band against the outer flange and maintaining the outer flange under compression between said band and said gasket supporting surface;

said expansion means being releasably positioned within said clamping band for expanding the clamping band outwardly and against the outer flange;

said expansion means including first and second members engaging the clamping band and means for moving said first and second members apart;

said first and second members having projections engaging the clamping band for expanding the clamping band when the first and second members are moved apart; the inner periphery of the band being provided with first and second elongated grooves each arranged a spaced distance inward from said first and second ends, at least one of said grooves receiving one of said projections;

the clamping band being provided with a groove along the inner periphery thereof spaced inwardly from said first end;

the projection of said first member being positioned in said groove and the projection of said second member engaging the second end of said band for expanding said clamping band as said first and second members are moved apart;

said expansion means comprises an expansion jack for moving said first and second members apart;

said expansion jack comprising a cylinder;

a piston arranged for reciprocating movement in the cylinder;

a piston rod coupled to said piston and extending outwardly from said piston and beyond one end of said cylinder;

one of said first and second members being pivotally mounted to said cylinder and having one surface portion being slidably engaged by the free end of said piston rod to move the free end of the pivotally mounted member along a curved path; and the remaining one of said first and second members being coupled to said cylinder.

* * * * *

UNITED STATES PATENT AND TRADEMARK OFFICE
CERTIFICATE OF CORRECTION

PATENT NO. : 4,903,970

DATED : February 27, 1990

INVENTOR(S) : Ditcher et al.

It is certified that error appears in the above-identified patent and that said Letters Patent is hereby corrected as shown below:

Column 1, line 47, "accomodate" should be --accommodate--

Column 7, line 17, "shown" should be --show--

Column 13, line 64, "should" should be --shoulder--

Column 14, line 32, "foregoining" should be --foregoing--

Column 17, line 16, "aid" should be --said--

Column 17, line 60, after "clamping" insert --band in the locked position against the inner periphery of said outer--

Column 18, line 29, "influenced" should be --influences--

Signed and Sealed this

Eighth Day of October, 1991

Attest:

HARRY F. MANBECK, JR.

*Attesting Officer*　　　　*Commissioner of Patents and Trademarks*